(12) United States Patent
Sun et al.

(10) Patent No.: US 9,139,445 B2
(45) Date of Patent: Sep. 22, 2015

(54) METHOD FOR CO-PRODUCING ALUMINA AND ACTIVATED CALCIUM SILICATE FROM HIGH-ALUMINA FLY ASH

(71) Applicant: INNER MONGOLIA DATANG INTERNATIONAL RECYCLING RESOURCE DEVELOPMENT CO., LTD., Hohhot (CN)

(72) Inventors: Junmin Sun, Hohhot (CN); Zhanjun Zhang, Hohhot (CN); Gang Chen, Hohhot (CN); Shaoyong Yan, Hohhot (CN); Qizhi Huo, Hohhot (CN); Licheng Wu, Hohhot (CN); Hongli Xu, Hohhot (CN); Lian Qin, Hohhot (CN); Xiaoxia Chen, Hohhot (CN)

(73) Assignee: INNER MONGOLIA DATANG INTERNATIONAL RECYCLING RESOURCE DEVELOPMENT CO., LTD., Inner Mongolia (CN)

( * ) Notice: Subject to any disclaimer, the term of this patent is extended or adjusted under 35 U.S.C. 154(b) by 0 days.

(21) Appl. No.: 14/012,983

(22) Filed: Aug. 28, 2013

(65) Prior Publication Data
US 2013/0343971 A1 Dec. 26, 2013

Related U.S. Application Data

(63) Continuation of application No. PCT/CN2011/075090, filed on Jun. 1, 2011.

(30) Foreign Application Priority Data

May 11, 2011 (CN) .......................... 2011 1 0117710

(51) Int. Cl.
*C01F 7/00* (2006.01)
*C01B 33/24* (2006.01)
(Continued)

(52) U.S. Cl.
CPC .............. *C01B 33/24* (2013.01); *C01F 7/0693* (2013.01); *C01F 7/085* (2013.01); *C01F 7/30* (2013.01)

(58) Field of Classification Search
None
See application file for complete search history.

(56) References Cited

U.S. PATENT DOCUMENTS

| 4,331,507 | A | * | 5/1982 | Roberts | ............................ 162/29 |
| 5,019,360 | A | | 5/1991 | Lehto | ............................ 423/132 |

FOREIGN PATENT DOCUMENTS

| CN | 1061949 A | 6/1992 |
| CN | 101028936 A | 9/2007 |

(Continued)

OTHER PUBLICATIONS

Zhang, Zhanjun, "Research on Extraction of Alumina and Other Useful Resources from High Aluminium Fly Ash" Northwestern University, Geochemistry PhD Thesis, May 2007.

(Continued)

*Primary Examiner* — Steven Bos
(74) *Attorney, Agent, or Firm* — J.C. Patents

(57) ABSTRACT

A method for co-producing alumina and activated calcium silicate from high-alumina fly ash, comprising the steps that: high-alumina fly ash reacts with sodium hydroxide solution to obtain desiliconized solution and desiliconized fly ash; milk of lime is added to the desiliconized solution to obtain activated calcium silicate; limestone and sodium carbonate solution are added to the desiliconized fly ash to blend raw slurry, the raw slurry is baked into clinker, and sodium aluminate crude solution is obtained from dissolution of the clinker; the sodium aluminate crude solution is subjected to the processes of first-stage deep desiliconization, second-stage deep desiliconization, carbonization decomposition, seed precipitation and etc to obtain alumina. According to the invention, less material flow and small amount of slag formation are achieved, the energy consumption, material consumption and production cost are low; the extraction rate of alumina is high, and meanwhile, activated calcium silicate with high added value is co-produced.

8 Claims, 2 Drawing Sheets

(51) Int. Cl.
*C01F 7/06* (2006.01)
*C01F 7/30* (2006.01)
*C01F 7/08* (2006.01)

(56) References Cited

FOREIGN PATENT DOCUMENTS

| CN | 101041450 A | 9/2007 |
|----|-------------|--------|
| CN | 101125656 A | 2/2008 |
| CN | 101284668 A | 10/2008 |
| CN | 101591023 A | 12/2009 |
| CN | 101591197 A | 12/2009 |
| CN | 101857250 A | 10/2010 |
| CN | 101941725 A | 1/2011 |
| CN | 102249253 B | 5/2013 |

OTHER PUBLICATIONS

International Search Report of International Application No. PCT/CN2011/075090, dated Mar. 1, 2012.

* cited by examiner

METHOD FOR CO-PRODUCING ALUMINA AND ACTIVATED CALCIUM SILICATE FROM HIGH-ALUMINA FLY ASH

CROSS-REFERENCE TO RELATED APPLICATIONS

This application is a continuation of International Application No. PCT/CN2011/075090, filed on Jun. 1, 2011, which claims the priority benefit of China Patent Application No. 201110117710.9, filed on May 11, 2011. The contents of the above identified applications are incorporated herein by reference in their entirety.

FIELD OF THE TECHNOLOGY

The present invention relates to high-tech resource utilization of fly ash, more particularly to a method for co-producing alumina and activated calcium silicate from high-alumina fly ash.

BACKGROUND

With the increasing shortage of bauxite resources, more and more attention has been paid to the use of industrial solid wastes such as fly ash and coal gangue for extracting alumina. Extraction of alumina from high-alumina fly ash and other aluminum-containing resources has drawn increasing attention. For example, minerals like boehmite and kaolinite are rich in Late Paleozoic coal bed and dirt band in Ordos Basin, the content of alumina in the fly ash generated after burning is up to 50%, which is equivalent to the content of alumina in medium-grade bauxite, so this fly ash is an extremely valuable raw material for alumina production. According to statistics, the potential reserve of high-alumina fly ash in the central and western regions of Inner Mongolia is as high as 15 billion tons. Comprehensive development and utilization of aluminum and silicon elements in these high alumina fly ash resources not only guarantees the strategic security of aluminum industry in China, but also is conducive to the protection and development of local environment, therefore, this is a cycling economy industry with great strategic significance.

Many enterprises and scientific research institutes have made considerable tests and researches on how to extract alumina from fly ash, and the process routes are generally classified into two categories, that is, acid method and alkaline method. Although extraction of alumina by means of acid method is low in slag formation and small in equipment investment, it brings quite severe corrosion to equipment, so large-scale production is seldom feasible. The alkaline method, which is further divided into lime sintering method and soda lime sintering method, is a relatively mature technical route for extracting alumina from fly ash and also potentially suitable for industrial popularization. Extraction of alumina from fly ash by means of lime stone sintering method is adopted by Inner Mongolia Melic Sea High-Tech Group Company, the sintering temperature for clinker is 1340-1390° C., and about 9 tons of slag is generated to produce 1 ton of alumina, so there are many disadvantages such as large energy consumption, high cost and large amount of residual slag. The idea of soda lime sintering method originates from the production of alumina from bauxite with low alumina silica ratio by means of soda lime sintering method, and the higher content of alumina in fly ash, the better suitability of this method. However, the alumina silica ratio of fly ash is low, so direct use of soda lime sintering method leads to not only difficult control for clinker sintering due to narrow sintering range, but also large material flow, energy consumption and slag formation. Hence, more attention has been paid to the idea of firstly extracting silicon and secondly extracting aluminum recently. Extraction of partial silica in fly ash at first realizes full utilization of silica source, reduces the amount of slag formation, raises the alumina silica ratio of residues and lowers the difficulty in clinker sintering.

In the patent "method for firstly extracting silicon and secondly extracting aluminum from fly ash" with the patent number 200710062534.7, sodium hydroxide solution with the concentration more than 40% is used for leaching fly ash, silicon is dissolved out in the form of sodium silicate, and then the sodium silicate is separated from alkaline leached slag by a water-added dilution procedure. $Na_2CO_3$ solution, which is generated after white carbon black is prepared from sodium silicate solution by carbonization decomposition method, is causticized by CaO, the resultant sodium hydroxide solution is recycled, and clinker is sintered from alkaline leached slag by means of soda lime sintering method or lime stone sintering method in order to produce alumina. In the patent "method for extracting silicon dioxide, alumina and gallium oxide from high-alumina fly ash" with the patent number 200710065366.7, sodium hydroxide solution is also firstly used for leaching silicon in fly ash, white carbon black is prepared from the extracted silicon by carbonization decomposition method, sodium hydroxide is recycled, and alumina is produced from desiliconized fly ash by means of soda lime sintering method. In these patents, the idea of firstly extracting silicon and secondly extracting aluminum based upon the consideration of phase features of fly ash results in the reduction of energy consumption and the improvement of element utilization, however, there are a few disadvantages in white carbon black generated after silicon extraction at present, such as relatively small domestic market share and limited amount in use; furthermore, compared with the production of white carbon black by means of traditional acid method, the production of white carbon black by means of carbonization decomposition method is hardly controllable in technique, more complex in equipment and higher in cost.

SUMMARY

The present invention provides a method for co-producing alumina and activated calcium silicate from high-alumina fly ash, in order to overcome the disadvantages in the prior art, to achieve less material flow and small amount of slag formation, relatively low energy consumption, material consumption and production cost and high extraction rate of alumina, to co-produce activated calcium silicate with high added value simultaneously, so this method can be widely applied in chemical industry field. The present invention provides a method for co-producing alumina and activated calcium silicate from high-alumina fly ash, in order to overcome the disadvantages in the prior art, to achieve less material flow and small amount of slag formation, relatively low energy consumption, material consumption and production cost and high extraction rate of alumina, to co-produce activated calcium silicate with high added value simultaneously, so this method can be widely applied in chemical industry field.

The method for co-producing alumina and activated calcium silicate from high-alumina fly ash comprises the following steps:

1) pre-desiliconization: high-alumina fly ash and sodium hydroxide solution are mixed, heated up and introduced into a pressure container for desiliconization reaction, and liquid phase desiliconized solution and solid phase fly ash filter cake are obtained by means of liquid-solid separation; the alumina silica ratio of the fly ash filter cake is higher than that of the high-alumina fly ash before desiliconization reaction; and the mass content of alumina in the high-alumina fly ash is more than 40%;

2) preparation of activated calcium silicate, which comprises the following steps: a. milk of lime is added to the desiliconized solution from step 1) for reaction, to obtain calcium silicate filter cake after filtering, and the filtrate is concentrated and then returned to step 1) and cyclically used as sodium hydroxide solution, thus realizing the caustification of desiliconized solution and the recovery and utilization of sodium hydroxide; b. the calcium silicate filter cake is washed and then added with clean water to prepare a calcium silicate slurry; and milk of lime is added to the calcium silicate slurry for dealkalization reaction; c. calcium silicate obtained from dealkalization reaction is washed with clean water and then added to dilute sulfuric acid solution for soaking; aluminum sulfate is added to decrease the pH to be below 10, soaking is then performed; and activated calcium silicate is obtained after washing, deslagging, filtering and drying;

3) preparation of raw slurry: sodium carbonate, limestone and/or quick lime solution are added to the fly ash filter cake to obtain a mixed slurry, and the mixed slurry is finely milled in a ball mill and blended into a raw slurry; the lime stone and the sodium carbonate need to be finely milled before mixing;

4) baking of clinker: the raw slurry is baked into clinker, and the clinker is coarse-grain clinker;

5) dissolution of clinker: the clinker and first-stage regulating solution are mixed for first-stage dissolution to obtain sodium aluminate crude solution and first-stage dissolution crude slag;

6) first-stage and second-stage deep desiliconization: sodium hydrate alumino-silicate seed crystal is added to the sodium aluminate crude solution for first-stage deep desiliconization to obtain first-stage desiliconized refined solution, then a part of the first-stage desiliconized refined solution is subjected to second-stage deep desiliconization to obtain second-stage desiliconized refined solution and second-stage deep desiliconization slag simultaneously; the deep desiliconization means the process of removing impurity silicon from the sodium aluminate crude solution to improve the purity of the sodium aluminate crude solution, and a two-stage desiliconization method is adopted, i.e. in the first stage, sodium hydrate alumino-silicate is added as seed and autoclaving is performed at high temperature and under high pressure; and in the second stage, milk of lime in a certain proportion is added to further remove residual silicon dioxide in sodium aluminate at a lower temperature. When the content of silicon is decreased to a certain value, carbonization decomposition and seed precipitation can be carried out for the production of aluminum hydroxide;

7) carbonization decomposition, seed precipitation and baking of aluminum hydroxide: the second-stage desiliconized refined solution is subjected to carbonization decomposition to obtain aluminum hydroxide as seed crystal, the aluminum hydroxide is added to the first-stage desiliconized refined solution in step 6), which is not subjected to second-stage deep desiliconization, seed precipitation is carried out to obtain aluminum hydroxide, and metallurgical-grade alumina is obtained by baking the aluminum hydroxide. The carbonization decomposition means the process of feeding carbon dioxide into the sodium aluminate crude solution after deep desiliconization so that most of the soluble aluminum therein is converted into aluminum hydroxide precipitates. The seed precipitation means the process of separating out a part of aluminum hydroxide by spontaneous crystallization of sodium aluminate solution, a fixed amount of aluminum hydroxide is generally added to sodium aluminate crude solution as seed crystal at first, and the temperature of sodium aluminate solution is then reduced to a range from 50-55° C., so that sodium aluminate crude solution is changed into supersaturated solution, and aluminum hydroxide is separated out based on the added aluminum hydroxide seed crystal as crystal nucleus.

Further, the mass concentration of the sodium hydroxide solution in step 1) is 10% to 30%, the mass ratio of sodium hydroxide to high-alumina fly ash is 0.2-0.8:1, the reaction temperature is 70-135° C., and the reaction time is 0.5-3 hours.

Further, separation (slag-off) of milk of lime from slag should be realized via a filter screen in the process of adding milk of lime to desiliconized solution, the concentration of effective calcium oxide in the milk of lime in step a is 100-200 g/L, the molar ratio of effective calcium oxide to $SiO_2$ in filtrate is 0.7-1.2, the reaction temperature is 50-100° C., and the reaction time is 30-120 minutes.

Further, in step b, the liquid-solid ratio of the calcium silicate slurry is 2-6, the addition amount of the milk of lime is that the mass ratio of effective calcium oxide in the milk of lime to activated calcium silicate on dry basis is 20-80:1, and the dealkalization reaction time is 20-100 minutes; calcium silicate obtained from dealkalization reaction is washed with clean water, the temperature of the clean water is from 60-100° C., and washing is performed 2-5 times.

Further, in step c, the concentration of the dilute sulfuric acid solution is 1/1000-10/1000, the mass ratio of activated calcium silicate on dry basis to concentrated sulfuric acid is 20-80:1, the soaking time is 10-60 minutes; the mass ratio of aluminum sulfate to activated calcium silicate on dry basis is 30-100:1, the soaking time is 5-60 minutes, the temperature of clean water for washing is 60-100° C., and washing is performed 1-4 times; the pH-decreased and washed activated calcium silicate is introduced into a sedimentation tank and added with water to blend slurry with the liquid-solid ratio of 2-8, slag on the bottom of the sedimentation tank is pumped away by a pump after quiescent sedimentation for 1-10 hours, and clean activated calcium silicate upper is filtered and then dried to obtain product. The activated calcium silicate prepared according to the invention has large surface area, low density, high activity and strong adsorption property, and has the advantages of light weight, good filling performance, energy saving and environmental protection and the like compared with the traditional fillers.

Further, the mixed slurry, which is obtained by mixing high-alumina fly ash filter cake, sodium carbonate solution, lime stone and/or quick lime in step 3), is milled in a tube mill and, then, blended into a raw slurry, the calcium ratio of the raw slurry is 1.95-2.01, the sodium ratio is 0.95-1.05, and the water content is 25-50%.

Further, baking of the raw slurry in step 4) is achieved in a rotary kiln, the baking temperature is 1150-1300° C., and the baking time is 10-60 minutes.

Further, in step 5), the grain diameter of the clinker during first-stage dissolution is not more than 8 mm, the liquid-solid mass ratio of first-stage regulating solution to clinker is 2-8:1, the dissolution temperature is 55-85° C., the dissolution time is 5-30 minutes, and the dissolution liquid is sodium aluminate crude solution.

Further, the first-stage regulating solution is blended from primary washing liquid for slag (second-stage dissolution slag of clinker), second-stage dissolution liquid and a part of carbonization decomposition mother solution and seed precipitation mother solution, and contains the main ingredients: 10-60 g/l of $Na_2O_k$, and 10-60 g/l of $Na_2O_c$. The term $Na_2O_k$ (k is the first Chinese phonetic alphabet of caustic alkali, k is omitted sometimes and the term $Na_2O$ is used directly) is used for representing the sum of the contents of NaOH and $NaAlO_2$ in sodium aluminate or other alkaline solution, i.e. the contents of NaOH and $NaAlO_2$ in such alkaline solutions are respectively converted into $Na_2O$, and then the value derived from addition of the both is regarded as the content of caustic alkali in solution, which is represented by $Na_2O_k$. For example, the contents of NaOH and $NaAlO_2$ in certain sodium aluminate solution are X g/l and Y g/l respectively, which are 31(X*62/80) and 56.7(Y*62/164) g/l when being converted into $Na_2O$, so the $Na_2O_k$ content of this solution is 31(X*62/80)+56.7(Y*62/164) g/l. The $Na_2O_c$ (C is the abbreviation for carbonate $CO_3^{2-}$) is used for representing the content of $Na_2CO_3$ in sodium aluminate or other alkaline solution, i.e. the content of $Na_2CO_3$ in solution is converted into $Na_2O$. For example, the content of sodium carbonate in certain solution is Z g/L, which is 70.19(Z*62/106) g/l when being represented in the form of $Na_2O_c$.

Further, the conditions of first-stage deep desiliconization in step 6) are as follows: 10-100 g/L of sodium hydrate alumino-silicate, 100-180° C., and 0.5-5 hours; the conditions of second-stage deep desiliconization are as follows: 2-30 g/L of the addition amount of effective calcium oxide, 70-100° C., and 0.5-5 hours. The effective calcium indicates the content of calcium oxide existing in milk of lime per unit volume in the form of calcium hydroxide (calcium oxide existing in the form of calcium carbonate is excluded), the unit is g/l, and these effective calcium can all participate in reaction to remove impurity silicon from sodium aluminate solution. The volume ratio of the sodium aluminate crude solution, which is only subjected to first-stage deep desiliconization, to the sodium aluminate crude solution, which is subjected to both first-stage deep desiliconization and second-stage deep desiliconization, is 1-3:1.

Further, the carbonization decomposition temperature of the second-stage desiliconized refined solution in step 7) is 85-90° C., the carbonization decomposition rate is 85-93%, and the seed precipitation technology is in conformity with the seed precipitation procedure of Bayer process.

Further, seed precipitation mother solution, aluminum hydroxide washing liquid, first-stage washing liquid for dissolution slag, a smaller part of carbonization decomposition mother solution and the like are blended into regulating solution, which serves as the dissolution liquid for first-stage and second-stage dissolution. The first-stage washing liquid for dissolution slag is the washing liquid obtained when second-stage dissolution slag is washed for the first time, and the aluminum hydroxide washing liquid is the washing liquid obtained by washing aluminum hydroxide produced by seed precipitation.

The present invention further provides a method for co-producing alumina and cement from high-alumina fly ash, comprising that: the first-stage dissolution crude slag in step 6) is finely milled and mixed with second-stage regulating solution for second-stage dissolution, the second-stage dissolution slurry is introduced into a sedimentation tank, added with water for dilution and subjected to sedimentation and separation, the bottom flow is second-stage dissolution slag, the overflow phase second-stage dissolution liquid is used for preparing regulating solution during first-stage dissolution; the second-stage dissolution slag is backwards washed three times and then added with carbide slag for reaction of dealkalization treatment, and the mixture is washed and filtered for producing the finished product of silicon-calcium slag of cement.

The liquid-solid ratio of second-stage regulating solution to first-stage dissolution crude slag is 2-8:1, the dissolution temperature is 55-85° C., the dissolution time is 5-30 minutes, the dissolution slurry is subjected to 1-5-fold dilution and then liquid-solid separation, the solid is second-stage dissolution slag, the average grain diameter of the second-stage dissolution slag is between 40 microns and 70 microns, and the maximum grain diameter is not more than 200 microns. The second-stage regulating solution is secondary washing liquid for slag, which contains the main ingredients: 5-50 g/L of $Na_2O_k$ and 1-30 g/L of $Na_2O_c$.

Further, the liquid-solid ratio of the second-stage dissolution slag slurry is 1.5-10, the mass ratio of second-stage dissolution slag on dry basis to carbide slag on dry basis is 100-10:1, the reaction temperature of second-stage dissolution slag and carbide slag is 60-100° C., the time for dealkalization reaction is 20 to 100 minutes, the temperature of clean water for washing is 60-100° C., the mass ratio of washing liquid to second-stage dissolution slag is 1-5:1, and washing is performed 1-5 times.

In the method for co-producing alumina and activated calcium silicate from high-alumina fly ash according to the invention, the process route of extracting partial silicon dioxide and then alumina is adopted, and compared with the existing technique for directly extracting alumina from fly ash, the present invention has the following advantages:

1. Compared with the technical route of extracting alumina from fly ash by means of lime stone sintering method or directly extracting alumina from fly ash by means of soda lime sintering method, the method disclosed by the present invention is capable of firstly extracting amorphous silicon from fly ash effectively and inexpensively, thus remarkably improving the alumina silica ratio of desiliconized fly ash and greatly saving the energy and material consumption for process.

2. In the present invention, high-quality activated calcium silicate is prepared from inexpensive raw materials—fly ash and quick lime, and the calcium silicate micro-powder prepared using this process is high in whiteness, fine in grains, uniform in granularity distribution, stable in chemical ingredients, low in content of Na, Fe and other impurities, and widely applicable for papermaking, coating, rubber, plastic, painting and other industries, so the utility value of fly ash can be raised dramatically.

3. Compared with lime stone sintering method for high-alumina fly ash, this technical route reduces the amount of slag formation by about 70%; and compared with red mud generated by producing alumina from bauxite, this slag is extremely suitable for the production of cement or cement clinker due to its ingredient characteristics.

4. The process is implemented in such a way of ultimate extraction and best use of materials, thus the economical and social values of high-alumina fly ash can be increased drastically.

DETAILED DESCRIPTION

To make the purposes, technical solutions and advantages of embodiments of the present invention clearer, the technical solutions in embodiments of the present invention will be clearly and completely described hereinafter with reference to the accompanying drawings in the embodiments of the invention. Obviously, those described here are not all but only a part of embodiments of the present invention. On the basis of the embodiments of the present invention, all other embodiments obtained by those skilled in this art without any creative effort should fall within the protection scope of the present invention.

Embodiment 1

Figure 1:
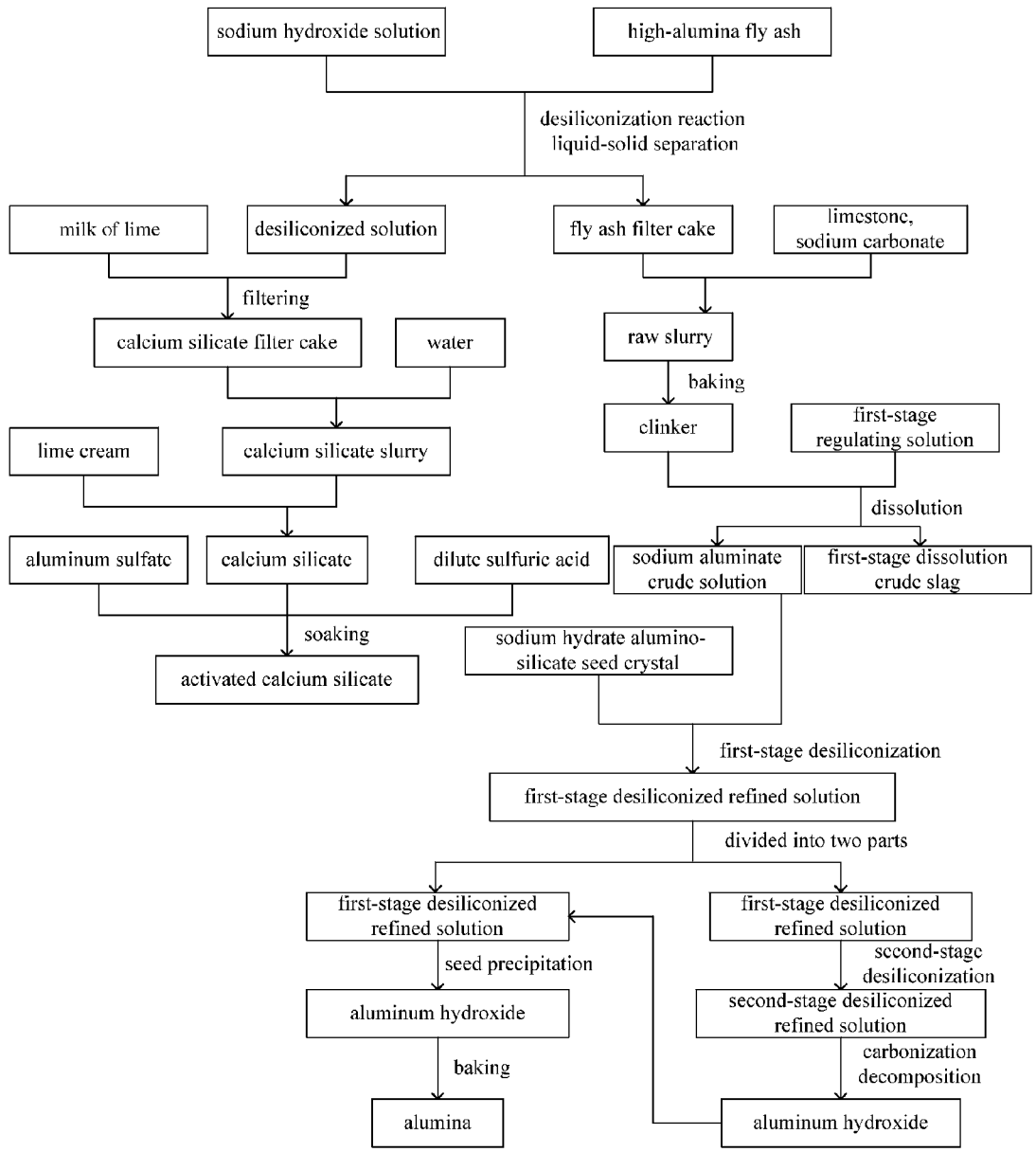
FIG. 1 is a production process flow chart provided by embodiment 1 of the invention.

FIG. 1 is a production process flow chart provided by embodiment 1 of the invention, and as shown in FIG. 1, the method for co-producing alumina and activated calcium silicate from high-alumina fly ash provided by this embodiment comprises the following steps:

1) pre-desiliconization: mixed solution, which is formed by high-alumina fly ash and sodium hydroxide solution with the mass concentration of 20% (the mass ratio of sodium hydroxide solution to high-alumina fly ash is 0.5:1) is heated up to 110° C. and then introduced into a pressure container for desiliconization reaction for 2 hours, and liquid phase desiliconized solution and solid phase fly ash filter cake are obtained by means of liquid-solid separation, the alumina silica ratio of the fly ash filter cake is higher than that of the high-alumina fly ash before desiliconization reaction; and the mass content of alumina in the high-alumina fly ash is more than 40%;

2) preparation of activated calcium silicate, which comprises the following steps: a. milk of lime is added to the desiliconized solution from the step 1) for reaction, the concentration of effective calcium oxide in the milk of lime is 150 g/L, the molar ratio of effective calcium oxide to $SiO_2$ in filtrate is 1, the reaction temperature is 80° C., the reaction time is 60 minutes, calcium silicate filter cake is obtained by means of filtering, and the filtrate is concentrated and then returned to step 1) and cyclically used as sodium hydroxide solution, thus realizing the caustification of desiliconized solution and the recovery and utilization of sodium hydroxide; b. the calcium silicate filter cake is washed and then added with clean water to prepare calcium silicate slurry with the liquid-solid ratio of 4; milk of lime is added to the calcium silicate slurry for dealkalization reaction, the addition amount of the milk of lime is that the mass ratio of effective calcium oxide in the milk of lime to activated calcium silicate on dry basis is 60:1, and the dealkalization reaction time is 70 minutes; calcium silicate obtained from dealkalization reaction is washed with clean water at 80° C., and washing is performed 4 times; c. calcium silicate obtained from dealkalization reaction is washed with clean water and then added to dilute sulfuric acid solution with the mass concentration of 5/1000, the mass ratio of activated calcium sulfate on dry basis to concentrated sulfuric acid is 40:1, and the soaking time is 40 minutes; the mass ratio of aluminum sulfate to activated calcium sulfate on dry basis is 70:1, the soaking time is 40 minutes, the temperature of clean water for washing is 70° C., and washing is performed twice; aluminum sulfate is added to decrease the pH to be below 10, the pH-decreased and washed activated calcium silicate is introduced into a sedimentation tank and added with water to blend slurry with the liquid-solid ratio of 6, slag on the bottom of the sedimentation tank is pumped away by a pump after quiescent sedimentation for 5 hours, and clean activated calcium silicate upper is filtered and then dried to obtain activated calcium silicate product with the whiteness of 92. The activated calcium silicate prepared according to the invention has large surface area, low density, high activity and strong adsorption property, and has the advantages of light weight, good filling performance, energy saving and environmental protection and the like compared with the traditional fillers.

3) preparation of raw slurry: limestone and sodium carbonate solution are added to the fly ash filter cake to obtain mixed slurry, and the mixed slurry is finely milled in a ball mill and blended into raw slurry; the lime stone and the sodium carbonate need to be finely milled before mixing, the calcium ratio of the raw slurry is 2, the sodium ratio is 1, and the water content is 30%;

4) baking of clinker: the raw slurry is baked under 1200° C. for 30 minutes to obtain clinker;

5) dissolution of clinker: the clinker and first-stage regulating solution are mixed for first-stage dissolution to obtain sodium aluminate crude solution and first-stage dissolution crude slag, the liquid-solid mass ratio of first-stage regulating solution to clinker is 6:1, the dissolution temperature is 75° C., and the dissolution time is 20 minutes; the first-stage regulating solution is blended from primary washing liquid for slag (second-stage dissolution slag of clinker), second-stage dissolution liquid and a part of carbonization decomposition mother solution and seed precipitation mother solution, and contains the main ingredients: 30 g/L of $Na_2O_k$, and 30 g/L of $Na_2O_c$.

6) first-stage and second-stage deep desiliconization: sodium hydrate alumino-silicate seed crystal is added to the sodium aluminate crude solution for first-stage deep desiliconization to obtain first-stage desiliconized refined solution, and the conditions are as follow: 50 g/L of sodium alumino-silicate, 155° C. and 2 hours; then a part of the first-stage desiliconized refined solution is subjected to second-stage deep desiliconization to obtain second-stage desiliconized refined solution and second-stage deep desiliconization slag simultaneously, and the conditions are as follows: 15 g/L as the addition amount of effective calcium oxide, 85° C. and 3 hours; the deep desiliconization means the process of removing impurity silicon from sodium aluminate crude solution to improve the purity of sodium aluminate crude solution, and a two-stage desiliconization method is adopted, i.e. in the first stage, sodium hydrate alumino-silicate is added as seed and autoclaving is performed at high temperature and under high pressure; and in the second stage, milk of lime in a certain proportion is added to further remove residual silicon dioxide in sodium aluminate at a lower temperature. When the content of silicon is decreased to a certain value, carbonization decomposition and seed precipitation can be carried out for the production of aluminum hydroxide; and the volume ratio of the sodium aluminate crude solution, which is only subjected to first-stage deep desiliconization, to the sodium aluminate crude solution, which is subjected to both first-stage deep desiliconization and second-stage deep desiliconization, is 2:1.

7) carbonization decomposition, seed precipitation and baking of aluminum hydroxide: the second-stage desiliconized refined solution is subjected to carbonization decomposition at 87° C. under the carbonization decomposition rate of 90%, the seed precipitation technology is in conformity with the seed precipitation procedure of Bayer process, aluminum hydroxide obtained from carbonization decomposition is used as seed crystal, the aluminum hydroxide is added to the first-stage desiliconized refined solution in step 6), which is not subjected to second-stage deep desiliconization, seed precipitation is carried out to obtain aluminum hydroxide, and metallurgical-grade alumina is obtained by baking the aluminum hydroxide. The carbonization decomposition means the process of feeding carbon dioxide into sodium aluminate crude solution after deep desiliconization so that most of the soluble aluminum therein is converted into aluminum hydroxide precipitates. The seed precipitation means the process of separating out a part of aluminum hydroxide by spontaneous crystallization of sodium aluminate solution, a fixed amount of aluminum hydroxide is generally added to sodium aluminate crude solution as seed crystal at first, and the temperature of sodium aluminate crude solution is then reduced to a range from 50-55° C. so that sodium aluminate crude solution is changed into supersaturated solution, and aluminum hydroxide is separated out based on the added aluminum hydroxide seed crystal as crystal nucleus. Seed precipitation mother solution, aluminum hydroxide washing liquid, first-stage washing liquid for dissolution slag, a small part of carbonization decomposition mother solution and the like are blended into regulating solution, which serves as the dissolution liquid for first-stage and second-stage dissolutions. The first-stage washing liquid for dissolution slag is the washing liquid obtained when second-stage dissolution slag is washed for the first time, and the aluminum hydroxide washing liquid is the washing liquid obtained by washing aluminum hydroxide produced by seed precipitation.

Embodiment 2

Figure 2:
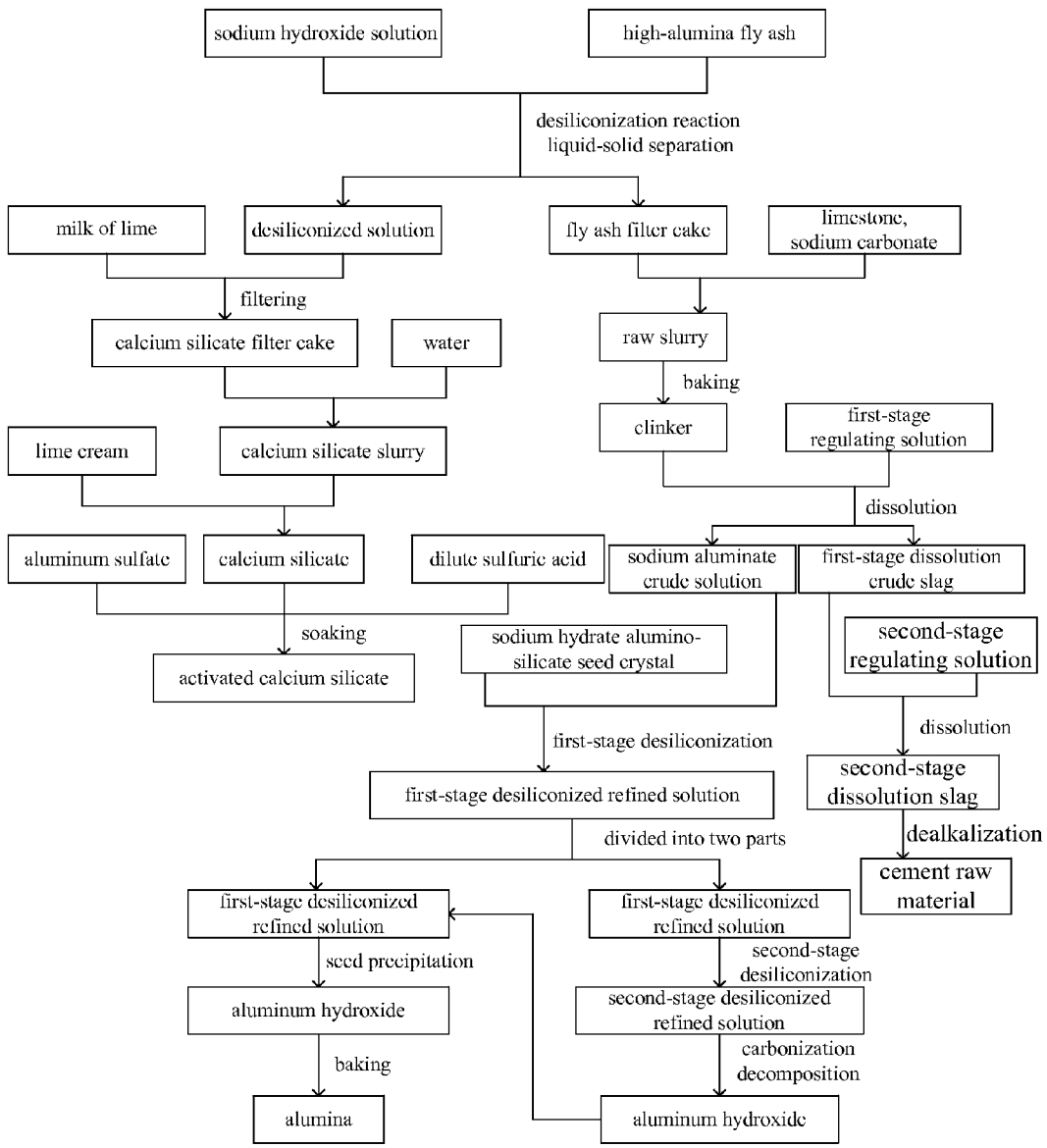
FIG. 2 is a production process flow chart provided by embodiment 2 of the invention.

FIG. 2 is a production process flow chart provided by embodiment 2 of the invention, and as shown in FIG. 2, the method for co-producing alumina and activated calcium silicate from high-alumina fly ash provided by this embodiment comprises the following steps of:

1) pre-desiliconization: mixed solution, which is formed by high-alumina fly ash and sodium hydroxide solution with the mass concentration of 10% (the mass ratio of sodium hydroxide solution to high-alumina fly ash is 0.6:1) is heated up to 130° C. and then introduced into a heat-insulating remaining tank for desiliconization reaction for 2.5 hours, and liquid phase desiliconized solution and solid phase desiliconized fly ash filter cake are obtained by means of liquid-solid separation after pressure reduction of an evaporator, wherein the alumina-silica ratio is 1.15 in the original fly ash and increases to 2.12 subsequent to desiliconization, and the concentration of $SiO_2$ in the desiliconized solution is 62 g/L;

2) preparation of activated calcium silicate, which comprises the following steps: a. milk of lime with the effective CaO content of 190 g/L is added to the desiliconized solution according to the molar ratio of effective CaO and $SiO_2$ of 0.8:1, reaction is performed at 90° C. for 1 hour while stirring, the rotating speed is 180 rpm, filtration is implemented using a horizontal vacuum belt-type filter to perform liquid-solid separation to obtain calcium silicate filter cake, and the filtrate is evaporated and concentrated and then returned to step 1) and cyclically used as sodium hydroxide solution, thus realizing the caustification of desiliconized solution and the recovery and utilization of sodium hydroxide; the concentration of $SiO_2$ in the desiliconized solution after reaction is reduced to 1.8 g/L, and the concentration of NaOH is 10%; and separation (slag-off) of milk of lime from slag should be realized in the preparation process of adding milk of lime to desiliconized solution;

b. the calcium silicate filter cake is washed three times with hot water at 90° C. and then added with clean water to prepare calcium silicate slurry with the liquid-solid ratio of 3:1; milk of lime is added to the calcium silicate slurry for dealkalization reaction according to the fact that the mass ratio of effective calcium in the milk of lime to activated calcium silicate on dry basis is 50:1; the dealkalization reaction time is performed for 40 minutes at 70° C., and then, washing twice with hot water at 90° C. is followed by filtering. The content of $Na_2O$ in the calcium silicate which is washed three times is decreased to 2.8%, and the pH is 13.7. The content of $Na_2O$ is decreased to 0.35% after dealkalization, and the pH is decreased to 12.5;

c. calcium silicate obtained from dealkalization reaction is washed with clean water and then added to dilute sulfuric acid solution with the mass concentration of 3/1000, the mass ratio of activated calcium silicate on dry basis to concentrated sulfuric acid is 30:1, and acid cleaning and soaking are performed for 20 minutes; aluminum sulfate is added according to the fact that the mass ratio of aluminum sulfate to activated calcium silicate on dry basis is 50:1, the soaking time is 10 minutes, washing twice with hot water at 90° C. leads to the decrease of the pH to 8.9, the washed activated calcium silicate is introduced into a sedimentation tank and added with water to blend slurry with the liquid-solid ratio of 2-8, slag on the bottom is pumped away by a pump after quiescent sedimentation for 1 to 10 hours, and clean activated calcium silicate upper is filtered and then dried to obtain activated calcium silicate product with the whiteness of 91. The activated calcium silicate prepared according to the invention has large surface area, low density, high activity and strong adsorption property, and has the advantages of light weight, good filling performance, energy saving and environmental protection and the like compared with the traditional fillers.

3) preparation of raw slurry: limestone (quick lime) and sodium carbonate solution are added to the fly ash filter cake to obtain mixed slurry, and the mixed slurry is finely milled in a ball mill and blended into raw slurry; the lime stone and the sodium carbonate need to be finely milled before mixing, wherein the quick lime accounts for 25% of the total calcium amount, the calcium ratio is regulated to 1.96, the sodium ratio is regulated to 1.0, and the water content of the raw slurry is regulated to 35%;

4) baking of clinker: the raw slurry is baked for 25 minutes in a rotary kiln at 1220° C. to obtain clinker, and the clinker is coarse-grain clinker;

5) dissolution of clinker: the clinker, and first-stage regulating solution with the concentrations of $Na_2O_k$ and $Na_2O_c$ being 50 g/L and 30 g/L respectively, flow backwards in a cylinder-shaped dissolution device based on a liquid-solid ratio of 1:2.5 in order to perform first-stage dissolution to obtain sodium aluminate crude solution and first-stage dissolution crude slag, the dissolution time is 10 minutes, and the dissolution temperature is 70° C.; in first-stage dissolution liquid, the concentration of $Al_2O_3$ is 136.3 g/L, the concentration of $SiO_2$ is 5.1 g/L, the caustic ratio is 1.21, and the first-stage net dissolution rate of $Al_2O_3$ is 68.3%; the first-stage regulating solution is blended from primary washing liquid for slag (second-stage dissolution slag of clinker), second-stage dissolution liquid and a part of carbonization decomposition mother solution and seed precipitation mother solution;

6) first-stage and second stage deep desiliconization, 50 g of sodium hydrate alumino-silicate seed crystal is added per liter of the sodium aluminate crude solution for first-stage deep desiliconization (the desiliconization temperature is 170° C. and the desiliconization time is 1.5 hours) to obtain first-stage desiliconized refined solution, and in first-stage desiliconized refined solution, the concentration of $Al_2O_3$ is 125.3 g/L, and the index for silicon amount is 326; sodium hydrate alumino-silicate is separated and then milk of lime is added to perform second-stage deep desiliconization, 10 g of milk of lime is added per liter of the solution, the temperature of desiliconization is 90° C. and the reaction lasts for 1.5 h. The second-stage desiliconized refined solution is obtained from second-stage deep desiliconization and second-stage deep desiliconization slag is obtained simultaneously, the concentration of $Al_2O_3$ in second-stage desiliconized refined solution is 117.5 g/L, and the index for silicon amount is 680; the deep desiliconization means the process of removing impurity silicon from sodium aluminate crude solution to improve the purity of sodium aluminate crude solution, and a two-stage desiliconization method is adopted, i.e. in the first stage, sodium hydrate alumino-silicate is added as seed and autoclaving is performed at high temperature and under high pressure; and in the second stage, milk of lime in a certain proportion is added to further remove residual silicon dioxide in sodium aluminate at a lower temperature. When the content of silicon is decreased to a certain value, carbonization decomposition and seed precipitation can be carried out for the production of aluminum hydroxide.

7) carbonization decomposition, seed precipitation and baking of aluminum hydroxide: the second-stage desiliconized sodium aluminate refined solution is subjected to serial-type continuous carbonization decomposition in a carbonization decomposition tank at 90° C. under the carbonization decomposition rate of 90%, aluminum hydroxide obtained from carbonization decomposition is used as seed crystal, the aluminum hydroxide is added to the first-stage desiliconized refined solution in the step 6), which is not subjected to second-stage deep desiliconization, seed precipitation is carried out at 58° C. and under the seed precipitation rate not less than 57% to obtain aluminum hydroxide, and alumina, which is a sandy alumina product meeting the demands of secondary metallurgic-grade alumina, is obtained by baking the aluminum hydroxide. The carbonization decomposition means the process of feeding carbon dioxide into sodium aluminate crude solution after deep desiliconization so that most of the soluble aluminum therein is converted into aluminum hydroxide precipitates. The seed precipitation means the process of separating out a part of aluminum hydroxide by spontaneous crystallization of sodium aluminate solution, a fixed amount of aluminum hydroxide is generally added to sodium aluminate crude solution as seed crystal at first, and the temperature of sodium aluminate crude solution is then reduced to a range from 50-55° C. so that sodium aluminate crude solution is changed into supersaturated solution, and aluminum hydroxide is separated out based on the added aluminum hydroxide seed crystal as crystal nucleus.

In this embodiment, co-production of cement can also be implemented, which comprises the steps that: the first-stage dissolution crude slag in the step 6) is finely milled and then mixed with second-stage regulating solution with the concentrations of $Na_2O_k$ and $Na_2O_c$ being 20 g/L and 10 g/L respectively, in order to perform second-stage dissolution at 75° C. for 15 minutes while milling in a rod mill. In second-stage dissolution liquid, the concentration of $Al_2O_3$ is 59.4 g/L, the concentration of $SiO_2$ is 1.5 g/L, the caustic ratio is 1.19, and the second-stage net dissolution rate of $Al_2O_3$ is 22.3%. The second-stage dissolution slurry is introduced into a sedimentation tank, added with water for dilution and subjected to sedimentation and separation, the bottom flow is second-stage dissolution slag, the overflow phase second-stage dissolution liquid is used for preparing regulating solution during first-stage dissolution; after the second-stage dissolution slag is backwards washed three times, the content of $Na_2O$ in slag is reduced to 1.39%. The dissolution slag is then subjected to dealkalization based upon the following conditions: the dry basis ratio of slag to carbide slag is 20:1, the liquid-solid ratio is 6:1, the dealkalization temperature is 95° C., the dealkalization time is 50 minutes, and the stirring rate is 120 rpm. Washing twice with clean water at 90° C. is performed after dealkalization, and then liquid-solid separation is carried out using a plate-and-frame filter press. The finally resultant slag after aluminum extraction has the main property below: the water content in filter cake is 29.5%. The dry basis filter cake contains the main chemical ingredients below: 54.8% of CaO, 0.42% of $Na_2O$, 24.5% of $SiO_2$, 4.59% of $Al_2O_3$, 2.49% of $Fe_2O_3$ and 7.98% of LOSS. The dry basis filter cake is used for the production of cement.

Finally, it should be noted that the embodiments above are merely provided for describing the technical solutions of the present invention, but not intended to limit the present invention. It should be understood by those skilled in the art that although the present invention has been described in detail with reference to the foregoing embodiments, modifications could be made to the technical solutions described in the aforementioned embodiments, or equivalent substitutions could be made to some technical features in the technical solutions; however, such modifications or substitutions do not cause the essence of corresponding technical solutions to depart from the spirit and scope of the technical solutions in the embodiments of the present invention.

What is claimed is:

1. A method for co-producing alumina and activated calcium silicate from high-alumina fly ash, comprising the following steps:
   1) high-alumina fly ash and sodium hydroxide solution are mixed, then heated up and introduced into a pressure container for desiliconization reaction, and liquid phase desiliconized solution and solid phase fly ash filter cake are obtained by liquid-solid separation;
   2) preparation of activated calcium silicate, which comprises the following steps:
   a. milk of lime is added to the desiliconized solution for reaction, to obtain calcium silicate filter cake by filtering;
   b. the calcium silicate filter cake is washed and then added to clean water to prepare a calcium silicate slurry, and milk of lime is added to the calcium silicate slurry for dealkalization reaction; and
   c. calcium silicate obtained from the dealkalization reaction is washed with clean water and then added to dilute sulfuric acid for an initial soaking to obtain an initial soaking mixture; aluminum sulfate is added to the initial soaking mixture to decrease the pH to be below 10, further soaking of the calcium silicate is then performed; and activated calcium silicate is obtained after washing, deslagging, filtering and drying the further soaked calcium silicate;
   3) sodium carbonate, limestone and/or quick lime solution are added to the fly ash filter cake to obtain a mixed slurry, and the mixed slurry is finely milled and blended into a raw slurry;
   4) the raw slurry is baked into clinker;
   5) the clinker and a first-stage regulating solution are mixed for first-stage dissolution to obtain a sodium aluminate crude solution and first-stage dissolution crude slag, the first-stage regulating solution contains the following ingredients: 10-60 g/L of $Na_2O_k$, and 10-60 g/L of $Na_2O_c$;
   6) sodium hydrate alumino-silicate seed crystal is added to the sodium aluminate crude solution for first-stage deep desiliconization to obtain a first-stage desiliconized refined solution, then a part of the first-stage desiliconized refined solution is subjected to second-stage deep desiliconization to obtain a second-stage desiliconized refined solution and second-stage deep desiliconization slag simultaneously;

7) the second-stage desiliconized refined solution is subjected to carbonization decomposition to obtain aluminum hydroxide as seed crystal, the aluminum hydroxide is added to the first-stage desiliconized refined solution, which is not subjected to second-stage deep desiliconization, seed precipitation is carried out to obtain aluminum hydroxide, and alumina is obtained by baking the aluminum hydroxide.

2. The method according to claim 1, characterized in that, the mass concentration of the sodium hydroxide solution in step 1) is 10-30%, the mass ratio of sodium hydroxide to high-alumina fly ash is 0.2-0.8:1, the reaction temperature is 70-135° C., and the reaction time is 0.5-3 hours.

3. The method according to claim 1, characterized in that, the concentration of effective calcium oxide in the milk of lime in step 2a is 100 g/L-220 g/L, the molar ratio of effective calcium oxide to $SiO_2$ in the desiliconized solution is 0.7 to 1.2, the reaction temperature is 50-100° C., and the reaction time is 30-120 minutes.

4. The method according to claim 1, characterized in that, the liquid-solid ratio of the calcium silicate slurry in step 2b is 2-6, the milk of lime is added in an amount such that the mass ratio of effective calcium oxide in the milk of lime to activated calcium silicate on dry basis is 20-80:1, and the dealkalization reaction time is 20-100 minutes.

5. The method according to claim 1, characterized in that, calcium ratio of the raw slurry in step 3) is 1.95-2.01, sodium ratio is 0.95-1.05.

6. The method according to claim 1, characterized in that, the baking temperature in step 4) is 1150-1300° C., and the baking time is 10-60 minutes.

7. The method according to claim 1, characterized in that, the grain diameter of the clinker during first-stage dissolution of step 5) is not more than 8 mm, the liquid-solid mass ratio of first-stage regulating solution to clinker is 2-8:1, the dissolution temperature is 55-85° C., the dissolution time is 5-30 minutes, the dissolution liquid is sodium aluminate crude solution, and the first-stage regulating solution contains the following ingredients: 10-60 g/L of $Na_2O_k$, and 10-60 g/L of $Na_2O_c$.

8. The method according to claim 1, characterized in that, the conditions of first-stage deep desiliconization in step 6) are as follows: 10 g/L-100 g/L of sodium hydrate aluminosilicate, 100-180° C., and 0.5-5 hours; the conditions of second-stage deep desiliconization are as follows: 2 g/L-30 g/L of the addition amount of effective calcium oxide, 70-100° C., and 0.5-5 hours; and the volume ratio of the sodium aluminate crude solution, which is only subjected to first-stage deep desiliconization, to the sodium aluminate crude solution, which is subjected to both first-stage deep desiliconization and second-stage deep desiliconization, is 1-3:1.

* * * * *